Aug. 16, 1966
V. E. ARNOLD ET AL
3,266,306
HUMIDITY RESISTANCE TESTER
Filed April 17, 1964
FIG. 1.
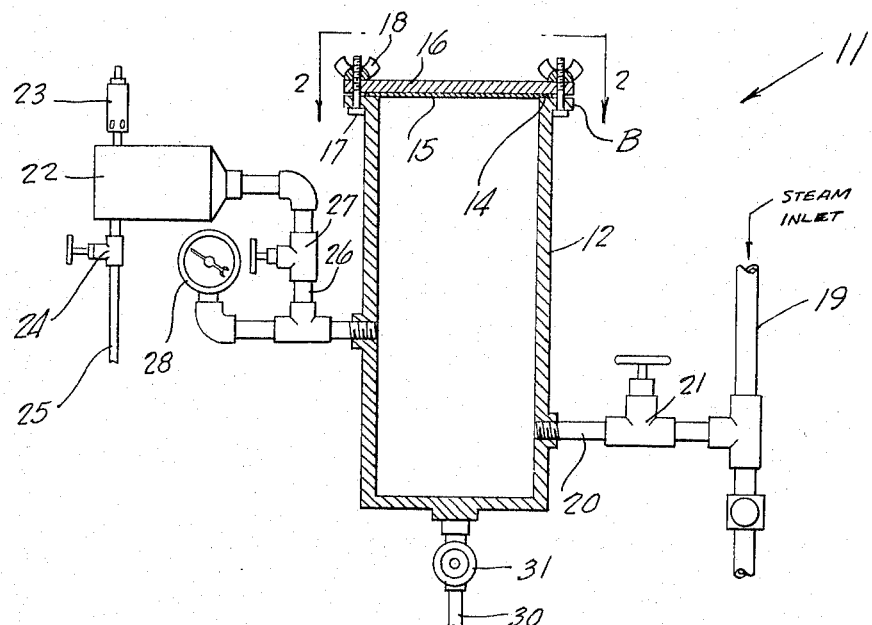
FIG. 2.
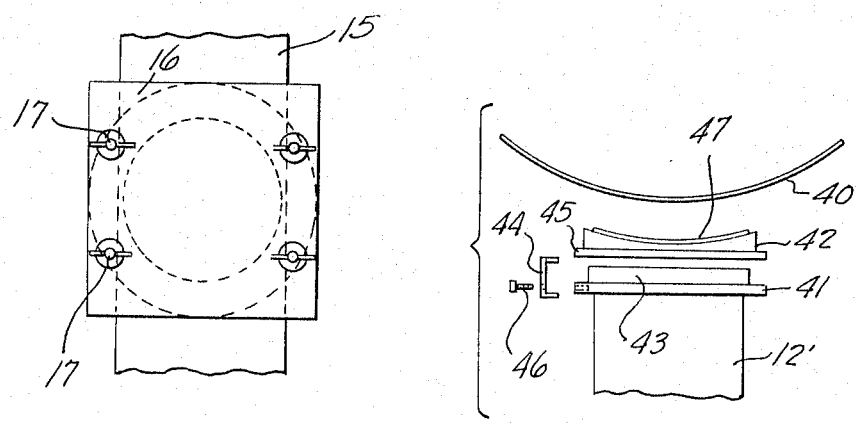
FIG. 3.
INVENTORS
VERNON E. ARNOLD,
SHARY D. HOLMES,
BY
McMorrow, Berman & Davidson
ATTORNEYS.

# United States Patent Office 3,266,306
Patented August 16, 1966

3,266,306
HUMIDITY RESISTANCE TESTER
Vernon E. Arnold, 1812 Ross Place SE., and Shary D. Holmes, 2605 Christine NE., both of Albuquerque, N. Mex.
Filed Apr. 17, 1964, Ser. No. 360,685
6 Claims. (Cl. 73—150)

This invention relates to apparatus for testing the resistance of surface materials to humidity, and more particularly to a device to test surfaces having paint and other coating materials thereon in order to establish the resistance of such materials to exposure to moisture and high humidity over prolonged periods of time.

A main object of the invention is to provide a novel and improved apparatus for testing the resistance of surface materials to humidity, the apparatus being relatively simple in construction, being easy to use, and providing a means of accelerated testing of a paint or other surface coating material in order to establish its resistance to exposure to moisture and high humidity for a prolonged period of time.

A further object of the invention is to provide an improved apparatus for testing the resistance of surface materials to humidity or moisture, the apparatus involving relatively inexpensive components, being easy to install or to apply to a surface to be tested, and being adjustable to provide accurately reproducible humidity conditions so as to give a precise evaluation of resistance of a paint or other surface coating material to humidity or moisture.

A still further object of the invention is to provide an an improved apparatus for testing the resistance of a surface material to humidity, the apparatus providing the equivalent of long-time exposure to humidity, being non-destructive to the surface being tested, enabling a humidity-exposure test to be conducted in a relatively short period of time, and being especially suitable for quality control programs and procedures in industrial manufacturing operations.

Further objects and advantages of the invention will become apparent from the following description and claims, and from the accompanying drawings, wherein:

FIGURE 1 is a vertical cross sectional view taken through a typical apparatus for testing the resistance of surface materials to humidity in accordance with the present invention and illustrating a typical complete testing system.

FIGURE 2 is a top plan view of the humidity chamber employed in the apparatus of FIGURE 1, said view being taken substantially on the line 2—2 of FIGURE 1.

FIGURE 3 is a fragmentary representation of a modification of a humidity chamber which may be employed in an apparatus according to the present invention, shown provided with means to engage an arcuately curved surface.

A prime purpose of the apparatus of the present invention is to provide a means of accelerating testing of a paint or other coating material in order to establish its resistance to exposure to moisture and high humidity for long periods of time. The apparatus of the present invention is intended to test not only the material itself but its proper application to the surface on which it is employed. The system of the present invention is particularly adapted for mass production operations, and is intended to provide a rapid and non-destructive test of surface materials.

In prior apparatus for testing moisture resistance various methods have been employed, for example, immersion in water, which has proven to be inadequate because liquids are not as penetrating as vapors and gases, and because pressure is not available to force the water into the surface coating being tested. Furthermore, the immersion test is relatively lengthy, and in many cases requires a test period of twenty days or more, and is therefore not adaptable to modern production methods.

Another test procedure has been to employ a humidity test cabinet in which the article to be tested is placed. However, exposure to the environment in a humidity cabinet requires testing for such a long period of time that it is impractical for quality control requirements in modern mass production procedures.

Another method heretofore employed to test resistance of surface materials to moisture has been to immerse the surfaces in boiling water. However, this test procedure is inadequate because there is no appreciable pressure in the associated vapor to force it into the coating, particularly, in short-term tests.

The principle of operation of the system of the present invention is to force water, either in liquid or vapor form, into or through the surface coating to be tested by means of pressure and temperature for a given predetermined period of time. If the coating surface is not resistant to this exposure, blistering, swelling, wrinkling, discoloration, or physical changes, easily observed, will take place.

In the system of the present invention, the test is conducted by clamping the sample to be tested to the open end of a test chamber, using an appropriate gasket to provide a seal. Steam under pressure is introduced into the chamber and contacts the exposed surface of the sample. The exposure is continued at a substantially constant pressure for a predetermined length of time. At the conclusion of the test, the sample is removed, dried and inspected for damage.

Referring to the drawings, 11 generally designates a typical testing apparatus according to the present invention. The apparatus comprises a humidity chamber 12 having an open end and being provided at said open end with an annular flange 13. The rim of the chamber 12 is formed with a seat 14 for receiving a sample to be tested, for example, for receiving a strip of material 15 having a coated surface to be tested. The strip is placed on a seat 14 with the coated surface thereof facing inwardly into the test chamber 12. A rectangular top cover plate 16 is provided, said cover plate being engageable on the flange 13 and being clamped thereto by means of respective pairs of clamping bolts 17, 17 engaged through flange 13 and the opposite margins of the cover plate 16 and being provided on their top ends with wing nuts 18.

Designated at 19 is a steam supply line containing steam under pressure. The supply line 19 is connected to one side of the humidity chamber 12 by a conduit 20 provided with a manually adjustable valve 21 which may be operated to provide a coarse adjustment of the pressure of the steam inside the test chamber 12.

Designated at 22 is an auxiliary chamber of substantially smaller capacity than the main humidity test chamber 12. The auxiliary chamber 22 is provided with a conventional release valve 23 which opens when the pressure in the auxiliary chamber reaches a predetermined limiting value. The chamber 22 is connected through a manually controlled valve 24 to a discharge line 25 which may be in communication with the atmosphere.

The intermediate portion of the main humidity test chamber 12 is connected to the auxiliary chamber 22 by a conduit 26 including a manually adjustable needle valve 27 which is employed to provide a fine adjustment of the pressure in the main chamber 12 in a manner presently to be described. Connected to conduit 26 to indicate the pressure within the main humidity chamber 12 is a conventional pressure gauge 28.

In a typical embodiment of the invention, the capacity of the main chamber 12 was approximately twelve-hundred cubic centimeters, whereas the auxiliary chamber 22 had a capacity of two-hundred-fifty cubic centimeters. The supply pressure is such as to allow the pressure in the test chamber 12 to be adjusted to approximately ten pounds per square inch, in a typical application of the apparatus illustrated in FIGURES 1 and 2.

A drain conduit 30 provided with a manually operated valve 31 is connected to the bottom of the humidity chamber 12 for draining condensate from said chamber, as required.

It will be seen that the provision of the valve 21 provides coarse adjustment of the steam pressure in the chamber 12 whereas the valve 27 allows fine adjustment of said steam pressure. The steam is allowed to discharge from the auxiliary chamber 22 through the relief valve 23 at a limiting value of pressure in the auxiliary chamber, thus preventing condensate "slugging" and affording fine control by means of the needle valve 27.

In operation, the sample, for example, the coated strip 15 illustrated in FIGURES 1 and 2, is clamped in the seat 14 with the coated surface thereof facing the interior of chamber 12, and the steam is turned on at the coarse control valve 21, the fine control valve 27 being approximately half-way open. As the steam pressure builds up, some of it passes into the auxiliary chamber 22, reaching a sufficient value of pressure therein to cause the relief valve 23 to open. As the pressure is reduced in the auxiliary chamber, the relief valve closes and steam again passes with greater velocity into the auxiliary chamber. As the pressure builds up, the velocity is reduced until such time as the relief valve again opens. This pressure cycling in the pressure chamber causes surging of steam through the fine adjustment valve 27, keeping it blown free of condensate. The pressures in the auxiliary chamber fluctuate by approximately five centimeters of mercury between opening and closing of the relief valve 23. This cycling produces such a small variation in the steam pressure in the main test chamber 12 as to be of no consequence. This is made possible because of the substantial ratio of the volume in the main test chamber 12 to that of the auxiliary chamber 22, and to the restriction provided at the fine control valve 27. The relief valve 23, in a typical embodiment of the invention, opens at approximately ten centimeters of mercury pressure and closes at approximately five centimeters of mercury pressure.

The relief valve 23 opens frequently and remains open approximately half of the time. If the test chamber pressure rises somewhat above the desired value, the fine adjustment valve 27 is opened slightly, allowing more steam to go into the auxiliary chamber and to actuate the relief valve 23 more frequently. Should the pressure in the test chamber fall below the desired value, the fine adjustment valve 27 is closed slightly, allowing less steam to escape and increasing the pressure in the test chamber. Should an adjustment be required too great to be accommodate by the fine adjustment valve 27, a different setting of the coarse adjustment valve 21 may be made.

The surging action produced by the intermittent opening of the relief valve 23 promotes efficient scavenging of condensate from the system and prevents "slugging" making it easy to properly regulate the pressure so as to obtain a desired value thereof in the main humidity chamber 12. The continual transmission of steam to the chamber 12 removes solvent fumes or vaporized material which may have been dislodged from the coating under test, preventing such material from producing additional damage. The pressure of the water vapor in the chamber 12 causes it to penetrate into and through the surface coating under test, causing accelerated degradation of said coating in a relatively short period of time, if the coating is such that it will suffer such degradation in actual use. Degradation of the coating is made apparent by its appearance, and by such manifestations as blistering, wrinkling, excessive softening, loss of adherence, or the like.

The apparatus makes it possible to effectively test a coated surface for durability and other properties thereof in a relatively short period of time, since the period of time of exposure is relatively short, being of the order of a few minutes. After the desired period of exposure, the test strip 15 is removed from its seat 14, dried, and examined for damage.

Obviously the apparatus may be employed for various related procedures other than quality control testing, for example, it may be employed as a research tool, particularly for making comparisons of coatings. The test is non-destructive to coatings which can successfully pass said test, producing no damage to the coating if it is adequate. The test is easily controlled and has a minimum of variables, the equipment is portable and easily set up for testing, and the evaluation of the test results requires a minimum of subjective decision, and long experience is not required in making such evaluations. The test is adaptable to many types of coating materials, such as epoxies, vinyls, alkyds, lacquers, phenolics and the like. The equipment is inexpensive in initial cost and also in operation and the test has excellent reproducibility as well as being simple to conduct, execute and interpret.

Where the article under test is arcuately curved, for example, has a cylindrical contour, a suitable adapter may be employed between the test chamber, shown at 12', and the arcuately curved surface, shown at 40, to be tested. This is illustrated in FIGURE 3. In this modification of the apparatus, the chamber is provided with an outwardly projecting annular flange 41 and an adapter ring 42 is engaged over the top end of chamber 12', resting on the flange 41. A suitable gasket 43 may be employed between the ring 42 and the flange 41. The ring 42 is secured to the flange 41 by a plurality of U-shaped rigid clips 44 engaging over the base flange 45 of ring 42 and the top flange 41 of chamber 12, the clip being secured to flange 41 by means of fastening screws 46. The ring 42 has a concave surface contoured to meet with the convex surface 40 to be tested, and is provided with a sealing gasket 47 interposed between ring 42 and the surface 40. Any suitable clamping means may be employed to secure the surface 40 to the flange 41. As above mentioned, the drain conduit 30 and valve 31 allows removal of steam and condensate at the conclusion of a test.

While certain specific embodiments of an approved apparatus for providing accelerated testing of painted or otherwise coated surfaces in order to establish their resistance to exposure to moisture and high humidity for a long period of time have been disclosed in the foregoing description, it will be understood that various modifications within the spirit of the invention may occur to those skilled in the art. Therefore it is intended that no limitation be placed on the invention except as defined by the scope of the appended claims.

What is claimed is:

1. An apparatus for testing the resistance of surface materials to humidity comprising a humidity chamber having an open end, a source of steam under pressure, conduit means communicatively connecting said source to said chamber, means to detachably clamp a sample surface in sealing relationship on said open end, whereby to expose the sample surface to the steam in the chamber, an auxiliary steam chamber, a discharge conduit connected to said auxiliary chamber, and bleeder conduit means connecting said first-named chamber to said auxiliary steam chamber and including an adjustable valve for bleeding off excess steam from the first-named chamber to maintain a predetermined steam pressure in said first-named chamber.

2. An apparatus for testing the resistance of surface materials to humidity comprising a humidity chamber having an open end, a source of steam under pressure, conduit means communicatively connecting said source to said chamber, means to detachably clamp a sample surface in sealing relationship on said open end, whereby to expose the sample surface to the steam in the chamber, an auxiliary steam chamber, a discharge conduit connected to said auxiliary chamber, bleeder conduit means connecting said first-named chamber to said auxiliary steam chamber and including an adjustable valve for bleeding off excess steam from the first-named chamber, and a relief valve connected to said auxiliary steam chamber to maintain a predetermined steam pressure in said first-named chamber.

3. An apparatus for testing the resistance of surface materials to humidity comprising a humidity chamber having an open end, a source of steam under pressure, conduit means communicatively connecting said source to said chamber, means to detachably clamp a sample surface in sealing relationship on said open end, whereby to expose the sample surface to the steam in the chamber, an auxiliary steam chamber, a discharge conduit connected to said auxiliary chamber, bleeder conduit means connecting said first-named chamber to said auxiliary steam chamber and including an adjustable valve for bleeding off excess steam from the first-named chamber, a relief valve connected to said auxiliary steam chamber to maintain a predetermined steam pressure in said first-named chamber, and a drain conduit connected to the bottom of said first-named chamber for draining off steam and condensate therefrom.

4. An apparatus for testing the resistance of surface materials to humidity comprising a humidity chamber having an open end, a pressure steam supply line, a conduit including a coarse steam pressure adjusting valve connecting said supply line to said chamber, means to detachably clamp a sample surface in overlying sealing relation to said open end, whereby to expose the sample surface to the steam in the chamber, an auxiliary steam chamber, a conduit including a fine steam pressure adjusting valve connecting said first-named chamber to said auxiliary steam chamber, and a discharge conduit including adjustable flow-controling valve means connected to said auxiliary chamber.

5. An apparatus for testing the resistance of surface materials to humidity comprising a humidity chamber having an open end, a pressure steam supply line, a conduit including a coarse steam pressure adjusting valve connecting said supply line to said chamber, means to detachably clamp a sample surface in overlying sealing relation to said open end, whereby to expose the sample surface to the steam in the chamber, an auxiliary steam chamber, a conduit including a fine steam pressure adjusting valve connecting said first-named chamber to said auxiliary steam chamber, a discharge conduit including adjustable flow-controlling valve means connected to said auxiliary chamber, and a relief valve connected to said auxiliary chamber.

6. An apparatus for testing the resistance of surface materials to humidity comprising a humidity chamber having an open end, a pressure steam supply line, a conduit including a coarse steam pressure adjusting valve connecting said supply line to said chamber, means to detachably clamp a sample surface in overlying sealing relation to said open end, whereby to expose the sample surface to the steam in the chamber, an auxiliary steam chamber, a conduit including a fine steam pressure adjusting valve connecting said first-named chamber to said auxiliary steam chamber, a discharge conduit including adjustable flow-controlling valve means connected to said auxiliary chamber, a relief valve connected to said auxiliary chamber, and a condensate drain conduit connected to the bottom wall of said first-named chamber.

References Cited by the Examiner

UNITED STATES PATENTS

| | | |
|---|---|---|
| 3,071,473 | 1/1963 | Chruley. |
| 3,128,780 | 4/1964 | Worrell _____ 73—150 X |

LOUIS R. PRINCE, *Primary Examiner.*

M. B. HEPPS, *Assistant Examiner.*